Feb. 18, 1947.  H. J. SCHAAPVELD  2,416,271
ATTACHMENT FOR CULTIVATOR TRACTORS
Filed Oct. 10, 1944  3 Sheets-Sheet 2

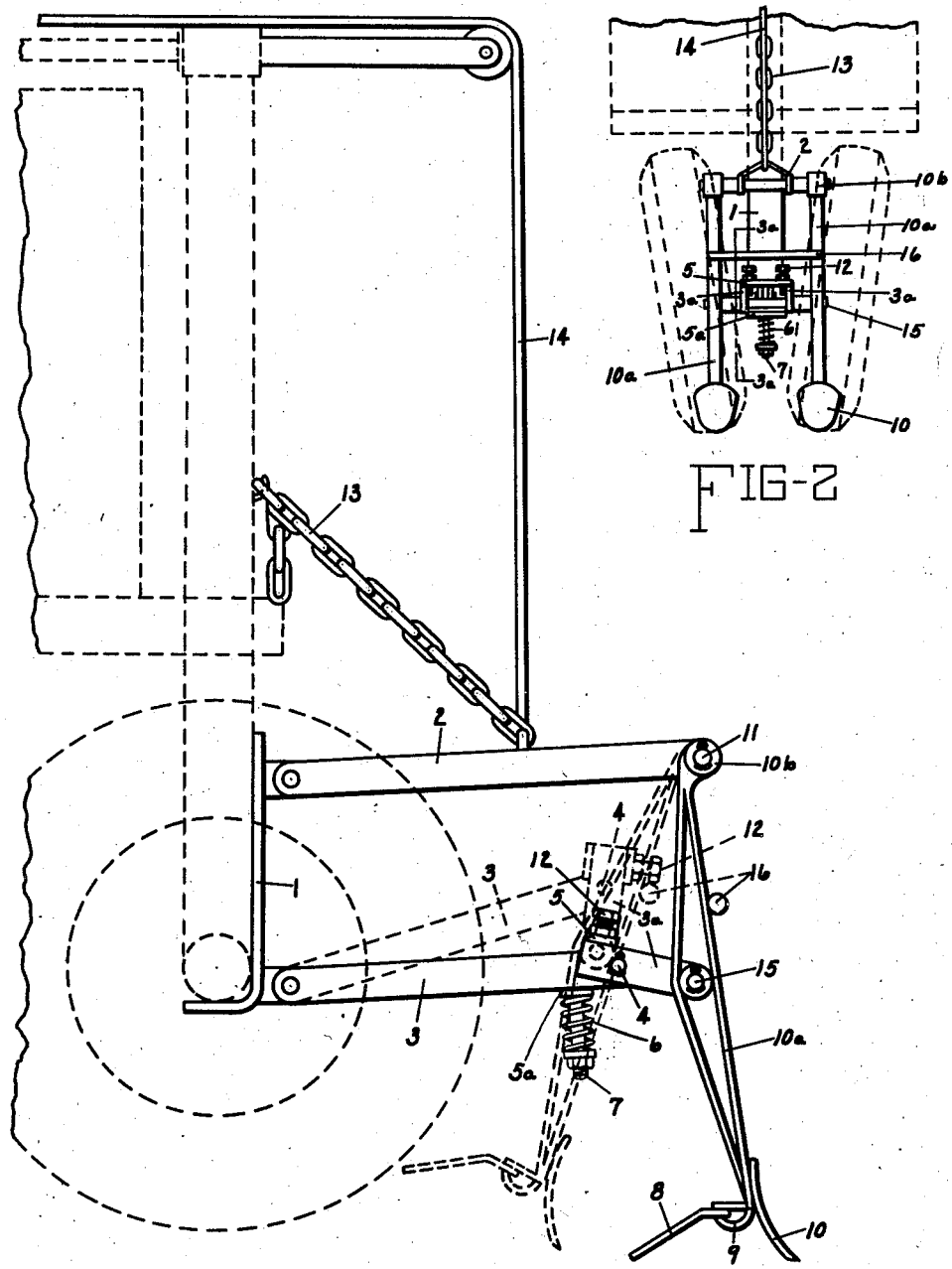

INVENTOR.
H.J. SCHAAPVELD
BY
Merrill M. Blackburn
Atty.

Feb. 18, 1947.  H. J. SCHAAPVELD  2,416,271
ATTACHMENT FOR CULTIVATOR TRACTORS
Filed Oct. 10, 1944  3 Sheets-Sheet 3
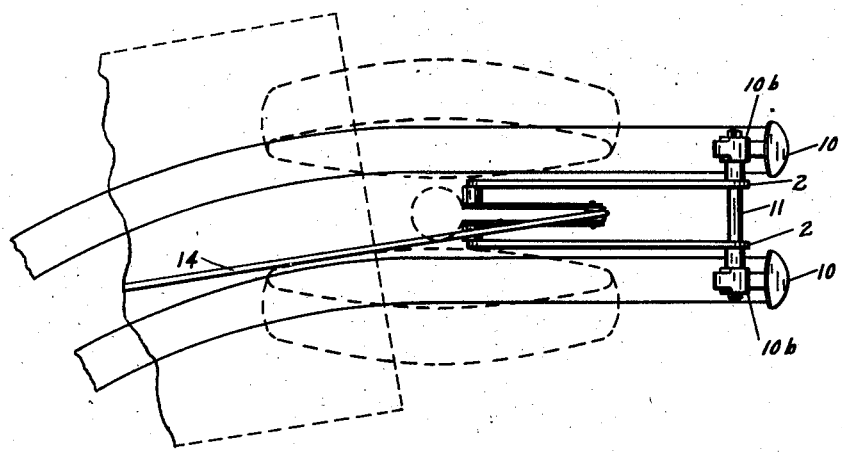
FIG-4
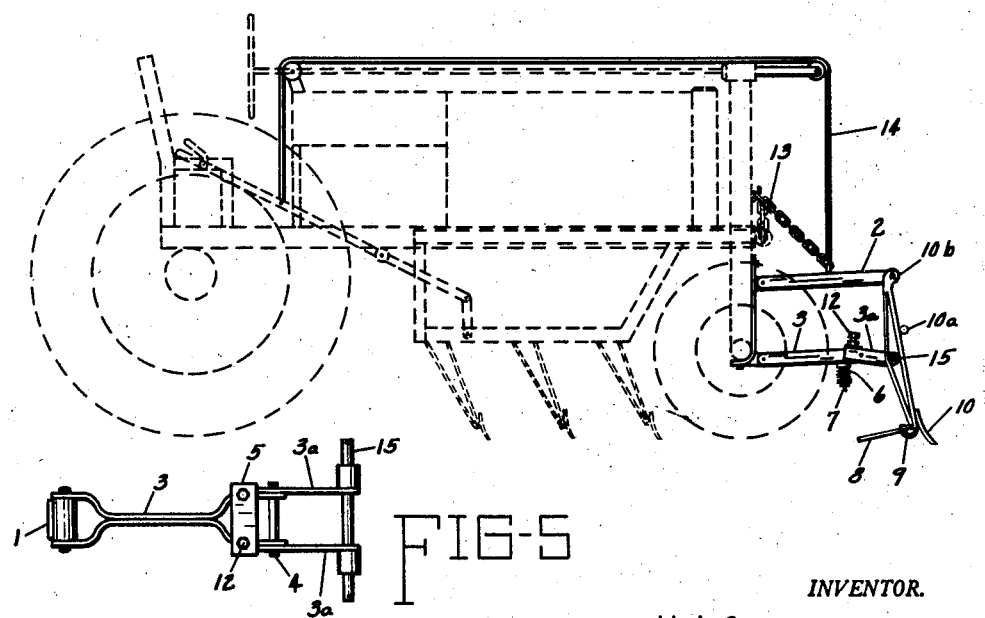
FIG-5
FIG-6
INVENTOR.
H.J. SCHAAPVELD
BY
Merrill M. Blackburn.

Patented Feb. 18, 1947

2,416,271

UNITED STATES PATENT OFFICE 2,416,271

ATTACHMENT FOR CULTIVATOR TRACTORS

Henry J. Schaapveld, near West Liberty, Iowa, assignor of one-half to F. B. Olsen, Iowa City, Iowa Application October 10, 1944, Serial No. 558,095

5 Claims. (Cl. 37—180)

My present invention relates to agricultural machinery and more particularly to means for guiding the front wheels of a tractor. Its main use is in assisting in guiding the front wheels of a cultivator tractor.

I have found that, particularly in contour and side-hill cultivating, there is a tendency for the front wheels of the tractor to slip down hill, resulting in the cultivator shovels, or other implements, tearing out the corn or other row crops. Also, turning the front wheels to steer the tractor so as to avoid this trouble does not always produce the desired result. I have also found that mounting furrowing shovels in front of the front wheels of the tractor and moderately near thereto results in the production of guiding furrows which prevent side slipping of the tractor and also results in filling previous furrows and depressions. These, then, are the main purposes of this invention. While I shall describe this invention in its application to a row crop tractor, it will be understood that the idea may have other applications, and I therefore do not wish to be limited to this specific use of my invention.

In the drawings annexed hereto and forming a part hereof,

Fig. 1 shows a side elevation of my present invention as applied to a tractor which is shown in outline by broken lines;

Fig. 2 represents a front view of the structure shown in Fig. 1;

Fig. 4 illustrates the use of this invention in assisting in guiding the front end of a tractor;

Fig. 5 shows a side elevation of a tractor and the furrowing implement, illustrating the conjoint action of the mechanisms for raising the furrowing shovels and the cultivator shovels simultaneously;

Fig. 6 shows a fragmentary plan of a part of this structure;

Figure 3:
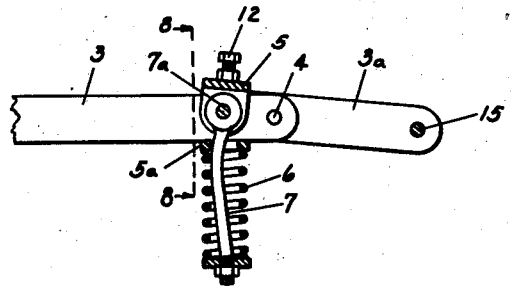
Fig. 3 is an enlarged view of a part of the structure shown in Fig. 1.

Reference will now be made in greater detail to the annexed drawings for a more complete description of this invention. In these drawings, a bracket 1 is shown as being attached to the front supporting structure of the tractor and as having arms or links 2 and 3 pivotally secured thereto and extending forwardly therefrom. The arm 3 is divided into two sections, designated by the numerals 3 and 3a. The sections are pivotally connected at 4, and this pivot member 4 connects the arms 3 and 3a so that they function together. A bar 5 connects the two arms 3a so that they function together while a bar 5a connects the forward end portions of the two bars 3. It will thus be apparent that the sections 3 operate as a unit and that the same is true of the sections 3a. The arm 3 may be formed as a single unit or as two separate bars integrally joined. It is clear that the end portions of these bars 3, whether they are separate or joined, should be spaced apart, as shown in Fig. 6.

A spring 6 surrounds the bolt 7 which has an eye at its upper end through which passes the pivot member 7a. It will therefore be apparent that by adjusting the nut on the lower end of this bolt it will be possible to vary the compression on the spring 6. This will vary the amount of force against or resistance applied to the shovels, which make the guiding furrows; necessary to cause buckling of the joint at pivot 4 in case a shovel should strike an obstruction.

An eye 9 is formed at the bottom of each of the vertical arms 10a and in these eyes are connected rods or plates 8 which may hang down when the shovels are raised but which, during use, extend out backwardly so as to prevent undue digging in of the shovels 10, if they are not otherwise sufficiently restrained. These shovels 10 are secured to the lower ends of the approximately vertical arms 10a which are provided with eyes or loops 10b at their upper ends for the reception of the bar 11 connecting the arms 2 for simultaneous action. A pivot member 15 passes through the sections 3a of the lower arms and through eyes formed at the middle portions of the vertical arms 10a, as shown most clearly in Fig. 1. It will therefore be apparent that if one or both of the shovels 10 should strike a buried stone or a large root, the vertical arms 10a would swing backward about the pivot 11 and cause buckling of the members 3, 3a about the pivot member 4, causing compression of the spring 6. This will permit the shovels 10 to pass over the obstruction. However, immediately upon the obstruction being cleared, the spring 6 will tend to straighten the lower arms 3, 3a, pushing the vertical arms 10a into the solid line position shown in Fig 1. The amount of pressure required to bend this joint can be adjusted by regulating the compression upon the spring, as by screwing the nut farther along the bolt 7 or backing it up thereon.

The depth to which the shovels 10 may normally go may be adjusted by adjusting the effective length of the chain 13. The pressure required to cause buckling of the joint at the pivot 4 may also be regulated by adjusting the bolts 12 which will result in a greater or less angle between the parts 3 and 3a, thereby varying the pressure necessary to cause backward swinging of the arms 10a. The ends of the stop bolts 12 bear against the upper edges of the links 3 when the parts are in the position shown in Fig. 1.

A cord or cable 14 is attached, as shown in Figs. 1 and 2, so that, whenever it is desired to withdraw the shovels 10 from the ground, this may be readily done by pulling backward on the cord or cable 14. The conjoint action of the furrowing shovels 10 and the cultivator shovels is illustrated in Fig. 5 where it is shown that the cable 14 is attached at its rearward end to the lever by means of which the cultivator shovels are raised and lowered and that this attachment is so made that, when the cultivator shovels are raised, the furrowing shovels are raised, and vice versa. Other methods of operating the shovels are contemplated, as, for example, by motive power from the tractor.

Another advantage of this construction is in cross-cultivating. It is usual that, when corn is cultivated in one direction, furrows are left between the rows of corn and then, when the corn is cross-cultivated, the front end of the tractor bounces badly in crossing these alternating furrows and ridges. My present construction obviates this difficulty by pushing part of the earth constituting the ridges forwardly into the furrows so that, when the tractor wheels cross the furrows, they do not jump up and down because of these furrows and ridges previously made, since they will have been largely removed by the two furrowing shovels.

Figure 3A:
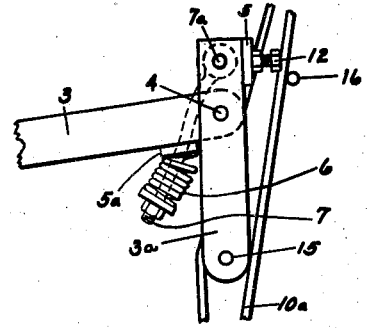
Fig. 3A shows the structure of Fig. 3, with the parts in a different position.
Figure 7:
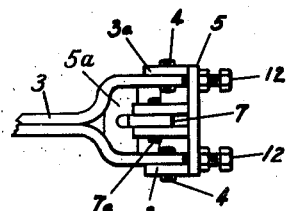
Fig. 7 is a view similar to Fig. 6 with the parts in a different position.
Figure 8:
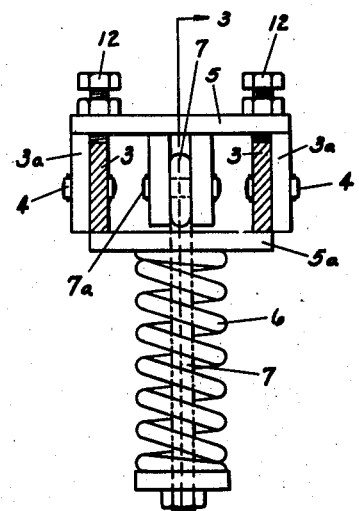
Fig. 8 represents a cross-section substantially along the plane indicated by the line 8—8, Fig. 3.

A comparison of Figs. 1 and 3A will somewhat show what takes place when shovels 10 strike an obstruction, as a rock, root, or unplowed sod at the end of the field, although this is not a clear exposition of this fact since the arm 10a swings farther back, permitting the shovel 10 to slide over the obstruction.

From this disclosure it will be seen that my invention is particularly valuable in cultivating because of the fact that it prevents side-slip of the front end of the tractor and, also, eliminates much of the bounce incident to cross-cultivating. It is usually necessary, when cross-cultivating, to drive the tractor at a speed which is lower then the tractor is adapted to develop, sometimes being necessary even to drive the tractor in second speed. However, with my construction applied to the tractor, it is possible to drive it at high speed without the tractor bouncing unduly. This also conserves gasoline.

It will of course be understood that the specific description of structure set forth above may be departed from without departing from the spirit of this invention as set forth herein and in the appended claims.

Having now described my invention, I claim:

1. A guiding attachment for a tractor comprising, in combination, furrowing shovels, pairs of arms pivotally carried by the front end of the tractor, one pair of said arms being above the other, each of the lower arms being jointed intermediate its ends and provided with spring means for holding the sections in approximate alignment but adapted to fold due to excessive backward pressure on the shovels, and approximately vertical arms connecting the upper and lower arms of said pairs, each of said vertical arms carrying adjacent its lower end one of said furrow-forming shovels adapted to form a guiding furrow in front of each of the front wheels of the tractor.

2. A structure as defined by claim 1, provided with means for raising the furrrow-forming shovels out of contact with the ground.

3. An attachment for a tractor, comprising a bracket to be fastened to the front end support of the tractor, furrowing shovels, upper and lower arms pivotally connected to the bracket and extending forwardly therefrom, each of the lower arms being jointed and capable of folding intermediate its ends, spring means tending to hold the sections of said lower arms approximately straight but capable of folding under excessive pressure against the shovels, longitudinally of the tractor, shovel-supporting arms each pivotally connected adjacent its upper end to one of the upper arms and adjacent its middle to the forward end of one of the lower arms, one of said furrowing shovels being attached to the lower end portion of each of the shovel arms, and a rearwardly projecting arm attached to the bottom end portion of each shovel arm to hold the shovel against too deep penetration into the earth's surface.

4. A structure as defined by claim 3, provided with means for raising the shovel-supporting arms above the ground when turning the machine at the end of the field or whenever necessary.

5. Means for assisting in the guiding of the front end of a cultivator tractor, comprising a pair of furrow-forming shovels for support in front of and moderately close to the front wheels of the tractor, supporting means secured to the front end of the tractor, pairs of substantially parallel arms pivotally connected to said supporting means and projecting forwardly from the tractor, an approximately vertical arm pivotally connected to the forward end of each of one pair of arms and having one of said shovels secured to its lower end, and connecting means connecting the lower pair of said pairs of arms, said connecting means being connected to the intermediate part of said vertical arms, each of the lower arms of said pairs of arms being jointed intermediate its ends whereby they may be caused by excessive backward pressure of the shovels on the lower ends of the vertical arms to fold, whereby to permit the shovels to pass by an obstruction.

HENRY J. SCHAAPVELD.

REFERENCES CITED

The following references are of record in the file of this patent:

UNITED STATES PATENTS

| Number | Name | Date |
| --- | --- | --- |
| 2,099,637 | Wendel | Nov. 16, 1937 |
| 2,228,490 | Smith | Jan. 14, 1941 |
| 2,347,373 | Silver | Apr. 25, 1944 |